United States Patent
Narayanaswamy et al.

(10) Patent No.: US 7,010,088 B2
(45) Date of Patent: Mar. 7, 2006

(54) MULTI-SLICE CT MULTI-LAYER FLEXIBLE SIGNAL TRANSMISSION DETECTOR CIRCUIT

(75) Inventors: Mahesh Raman Narayanaswamy, Milwaukee, WI (US); Matthew Aaron Halsmer, Waukesha, WI (US)

(73) Assignee: General Electric Company, Schnectady, NY (US)

( * ) Notice: Subject to any disclaimer, the term of this patent is extended or adjusted under 35 U.S.C. 154(b) by 247 days.

(21) Appl. No.: 10/604,449

(22) Filed: Jul. 22, 2003

(65) Prior Publication Data

US 2005/0018810 A1    Jan. 27, 2005

(51) Int. Cl.
*H05G 1/08*    (2006.01)

(52) U.S. Cl. .................... 378/91; 378/98.8; 378/19; 250/370.09

(58) Field of Classification Search ............... 378/4, 378/19, 91, 98, 98.8; 250/208.1, 214.1, 214 R, 250/370.08, 370.09; 439/492, 493
See application file for complete search history.

(56) References Cited

U.S. PATENT DOCUMENTS

| 6,299,713 | B1 | 10/2001 | Bejtlich | 156/64 |
| 6,343,171 | B1 | 1/2002 | Yoshimura et al. | 385/50 |
| 6,475,824 | B1 * | 11/2002 | Kim | 438/66 |
| 6,859,514 | B1 * | 2/2005 | Hoffman | 378/19 |

* cited by examiner

*Primary Examiner*—Edward J. Glick
*Assistant Examiner*—Courtney Thomas
(74) *Attorney, Agent, or Firm*—Michael Della Penna (57) ABSTRACT

A flexible detector array transmission circuit (12) for an x-ray imaging system (10) may include an electrically conductive substrate layer (70) that is electrically coupled to a detector (68). A mono-directional conductive layer (80) is also electrically coupled to the substrate layer (70). One or more flexible circuit layers (72) are electrically coupled to the mono-directional conductive layer (80). The circuit layers (72) direct x-ray signals, generated from the detector (68), to a data acquisition system (42).

18 Claims, 6 Drawing Sheets

Fig. 6

MULTI-SLICE CT MULTI-LAYER FLEXIBLE SIGNAL TRANSMISSION DETECTOR CIRCUIT

BACKGROUND OF INVENTION

The present invention relates generally to multi-slice computed tomography (CT) imaging systems, and more particularly, to an apparatus and system for transmission of signals from a detector array within a computed tomography imaging system and to a method of reconstructing an image using the apparatus and system.

There is a continuous effort to increase x-ray imaging system capabilities. This is especially true in computed tomography (CT) imaging systems. A CT imaging system typically includes an x-ray source that projects a fan-shaped x-ray beam through an object being imaged, such as a patient, to an array of radiation detectors. The beam is collimated to lie within an X-Y plane, generally referred to as an "imaging plane". Intensity of radiation from the beam received at the detector array is dependent upon attenuation of the x-ray beam by the object. Attenuation measurements from each detector are acquired separately to produce a transmission profile.

The detector array can contain hundreds of detector diodes, which receive the x-ray beam. A typical detector array is coupled to a series of flexible transmission circuits or cables containing hundreds of parallel fine line connections that transfer received signal information from each detector diode to a support and data acquisition system.

A flexible transmission circuit having a single flexible transmission circuit layer is often coupled between a non-conductive ceramic substrate and a photodiode. The flexible transmission circuit is coupled to the photodiode via a large quantity of wire bond connections. The wire bond connections inherently add complexity to the system and limit the number of transmissive connections between a diode and the single flexible circuit.

Also, with an increased number of signal transmission lines within a given amount of available space of a flexible transmission circuit comes limited flexibility in routing of the lines between a single layered flexible circuit and a detector diode.

Image resolution and image coverage, corresponding to number of slices per coverage area and size of a coverage area for a given diode, of a CT imaging system is directly related to the number of parallel transmissive signal connections available between a detector array and a data acquisition system. Thus, since customers desire x-ray scanning with high quality images, which requires a high level of image resolution, a desire exists for increased electrical yield and performance of a flexible transmission circuit.

It would therefore be desirable to provide a transmission device that is capable of transferring an increased number of parallel-generated detector signals between a detector array and a data acquisition system of a CT imaging system or in simplified terms, and as stated above, increased electrical yield and performance. It is also desirable that the transmission device maximizes available circuit layout space, increases routing pattern flexibility, be relatively simple to manufacture, and increases electrical performance.

SUMMARY OF INVENTION

The present invention provides an apparatus and system for transmission of signals from a detector array within a computed tomography (CT) imaging system and a method of reconstructing an image using the stated apparatus and system. A flexible detector array transmission circuit for an x-ray imaging system is provided and may include an electrically conductive substrate layer that is electrically coupled to a detector. A mono-directional conductive layer is also electrically coupled to the substrate layer. One or more flexible circuit layers are electrically coupled to the mono-directional conductive layer and direct x-ray signals, generated from the detector, to a data acquisition system.

One of several advantages of the present invention is that it provides a flexible detector array transmission circuit having multiple flexible circuit layers. This provides less overall pitch density per flexible circuit layer, yet increased electrical yield, such as increased isolation resistance and/or decreased signal capacitance. In so doing, the present invention also provides increased electrical performance and easier manufacturability of a flexible detector array transmission circuit. The present invention minimizes the number of interconnects within a flexible detector array transmission circuit while increasing resolution potential for a given detection area and overall coverage potential.

Another advantage of the present invention is that it provides an electrically conductive substrate layer that not only provides a rigid member for alignment of the detector array and a mechanical structure for withstanding acceleration forces experienced during rotation of a CT gantry, but also provides an electrical conduit for direct routing of electrical connections. The present invention thus provides increased routing pattern flexibility.

The present invention itself, together with attendant advantages, will be best understood by reference to the following detailed description, taken in conjunction with the accompanying figures.

BRIEF DESCRIPTION OF DRAWINGS

For a more complete understanding of this invention reference should now be had to the embodiments illustrated in greater detail in the accompanying figures and described below by way of examples of the invention wherein.

DETAILED DESCRIPTION

A flexible transmission circuit may include an anisotropic conductive film (ACF) layer to bond and provide connections between a diode, a flexible transmission circuit, and a substrate. ACF, as known in the art, is a z-axis conductive film that only provides electrical connection along a single axis or in a single direction. The ACF layer thus transfers received signals from diodes to the flexible circuit, without cross-interference of signals within the ACF layer.

The flexible transmission circuit can be limited in the number of individual and separate signal connections that can be transmitted through the ACF layer and between the diode and the single flexible circuit due to available pitch spacing between connections and current flexible circuit manufacturing techniques. Current manufacturing techniques are only capable of providing a given maximum number of fine line connections, with dielectric insulation material therebetween, for a specified amount of available space. In other words, there is a manufacturing limit as to how close the fine lines can be spaced apart while maintaining separation and isolation between the fine lines. The larger the number of connections, for a given amount of available space, the worse the electrical performance of a flexible transmission circuit and the more difficult to manufacturer.

Current technology is capable of providing connections having up to approximately 30 microns of space between connections. On the other hand, current diodes have high-density pixelation and are capable of providing a large quantity of parallel signal transmissions that exceed physical transmission and isolation limitations of the ACF layer and the single flexible circuit.

There are various types of detector diodes. In computed tomography (CT) applications, frontlit diodes have been commonly utilized in detector arrays. Recently, with the development of backlit diodes, there is now a current desire to use backlit diodes rather than frontlit diodes within a detector array. Backlit diodes are generally preferred since signals can be retrieved through a backside of the diodes rather than from a lateral side, as with frontlit diodes. Since signals are retrieved from a lateral side on frontlit diodes, frontlit diodes are inherently limited in pixel density. There is more routing space available off the backside for increased pixel density, as opposed to the side of the diodes. In receiving signals through a backside, backlit diodes may be "tiled" or stacked in a Z-direction of an x-ray system to provide a wider coverage area. For example, a pair of backlit diodes may be used in replacement of a single frontlit diode, thus providing twice the coverage area. Although resolution of frontlit diodes and backlit diodes is a function of supplier capability of pixel size, utilizing the configuration of the present invention as described in detail below, in combination with backlit diodes, provides an increased amount of pixels for a given coverage area.

In one embodiment of the present invention, backlit diodes are used in conjunction with a multi-layered flexible circuit to provide a detector array circuit with increased resolution and coverage. The backlit diodes in conjunction with the multi-layered flexible circuit are able to receive and route an increased number of x-ray signals to a data acquisition system, which is described in further detail below.

In the following figures, the same reference numerals will be used to refer to the same components. While the present invention is described with respect to an apparatus and system for transmission of signals from a detector array within a CT imaging system, the following apparatus and system is capable of being adapted for various purposes and is not limited to the following applications: magnetic resonance imaging (MRI) systems, CT systems, radiotherapy systems, X-ray imaging systems, ultrasound systems, nuclear imaging systems, magnetic resonance spectroscopy systems, and other applications known in the art.

In the following description, various operating parameters and components are described for one constructed embodiment. These specific parameters and components are included as examples and are not meant to be limiting.

Also, in the following description the term "flexible circuit layer" refers to a layer that is coupled to or within a flexible circuit cable. The layer itself is not necessarily, but may be, flexible. For example, a flexible circuit layer of the present invention may include multiple signal lines with flexible or rigid insulating materials therebetween. A flexible circuit or flexible circuit cable may contain one or more flexible circuit layers. The flexible circuit layer and the flexible circuit cable may be integrally formed into a single device. As an example, a flexible circuit layer may include signal routing on an insulating layer, which may be formed of polyimide material. A flexible circuit cable has multiple flexible circuit layers that are laminated together to form a cable.

Figure 1:
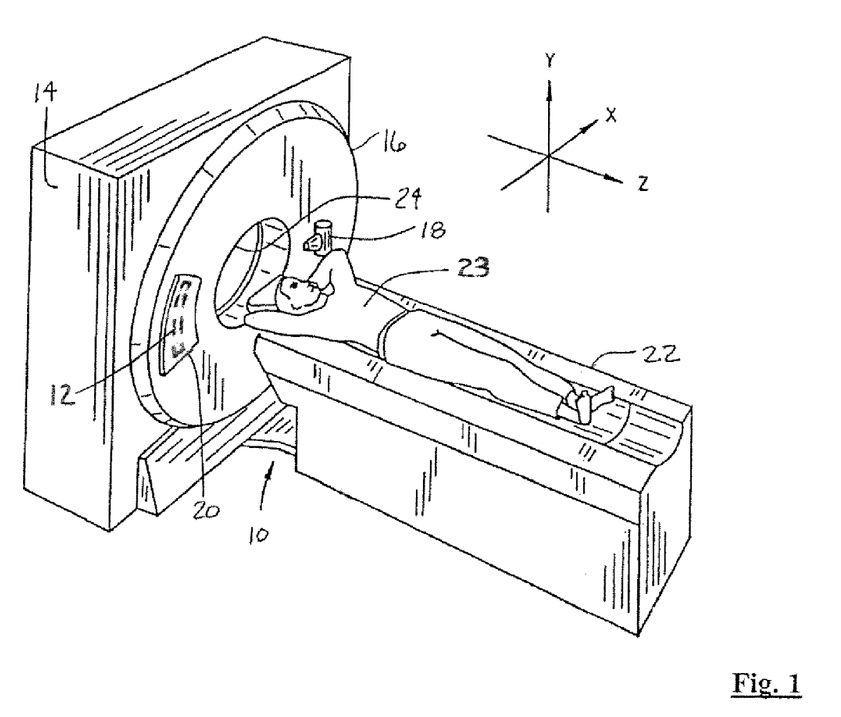
FIG. 1 is a pictorial view of a multi-slice helical scan CT imaging system utilizing a flexible detector array transmission circuit in accordance with an embodiment of the present invention.

Referring now to FIG. 1, a pictorial view of a multi-slice CT imaging system 10, utilizing a flexible detector array transmission circuit 12 in accordance with an embodiment of the present invention, is shown. The imaging system 10 includes a gantry 14 that has a rotating inner portion 16 containing an x-ray source 18 and a detector array assembly 20. The x-ray source 18 projects a beam of x-rays towards the detector assembly 20. The source 18 and the detector assembly 20 rotate about an operably translatable table 22. The table 22 is translated along the z-axis between the source 18 and the detector assembly 20 to perform a helical scan. The beam, after passing through a medical patient 23, within a patient bore 24, is detected at the detector assembly 20 to generate projection data that is used to create a CT image.

Figure 2:
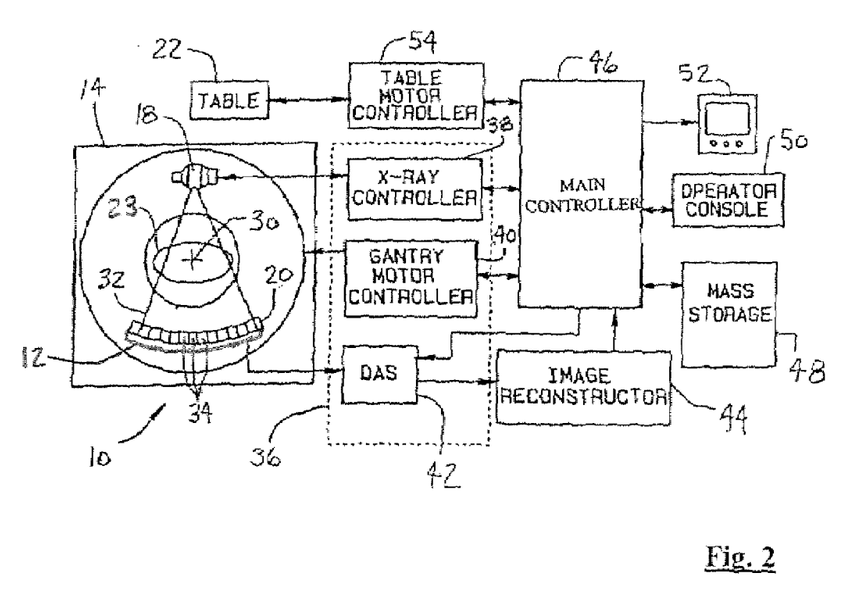
FIG. 2 is a block diagrammatic view of the multi-slice helical scan CT imaging system in accordance with an embodiment of the present invention.

Referring now to FIG. 2, a block diagrammatic view of the system 10 in accordance with an embodiment of the present invention, is shown. The source 18 and the detector assembly 20 rotate about a center axis 30. The beam 32 is received by multiple detector elements 34. Each detector element 34 generates an electrical or x-ray signal corresponding to the intensity of an impinging x-ray beam 32 and may be in the form of a backlit diode or in some other form known in the art. As the beam 32 passes through the patient 23, the beam 32 is attenuated. Rotation of the center portion of the gantry, and the operation of the source 18 are governed by a control mechanism 36. Control mechanism 36 includes an x-ray controller 38 that provides power and timing signals to source 18 and a gantry motor controller 40 that controls the rotational speed and position of the center portion of the gantry. A data acquisition system (DAS) 42 samples analog data from the detector elements 34, via the flexible transmission circuit 12, and converts the analog data to digital signals for subsequent processing. An image reconstructor 44 receives sampled and digitized x-ray data from the DAS 42 and performs high-speed image reconstruction. A main controller 46 stores the CT image in a mass storage device 48.

The main controller 46 also receives commands and scanning parameters from an operator via an operator console 50. A display 52 allows the operator to observe the reconstructed image and other data from the main controller 46. Operator supplied commands and parameters are used by the main controller 46 in operation of the DAS 42, the x-ray controller 38, and the gantry motor controller 40. In addition, the main controller 46 operates a table motor controller 54, which translates the table 22 to position patient 12 in gantry 14.

The x-ray controller 38, the gantry motor controller 40, the image reconstructor 44, the main controller 46, and the table motor controller 54 are preferably based on micro processors, such as a computer having a central processing unit, memory (RAM and/or ROM), and associated input and output buses. The x-ray controller 38, the gantry motor controller 40, the image reconstructor 44, the main controller 46, and the table motor controller 54 may be a portion of a central control unit or may each be stand-alone components as shown.

Figure 3:
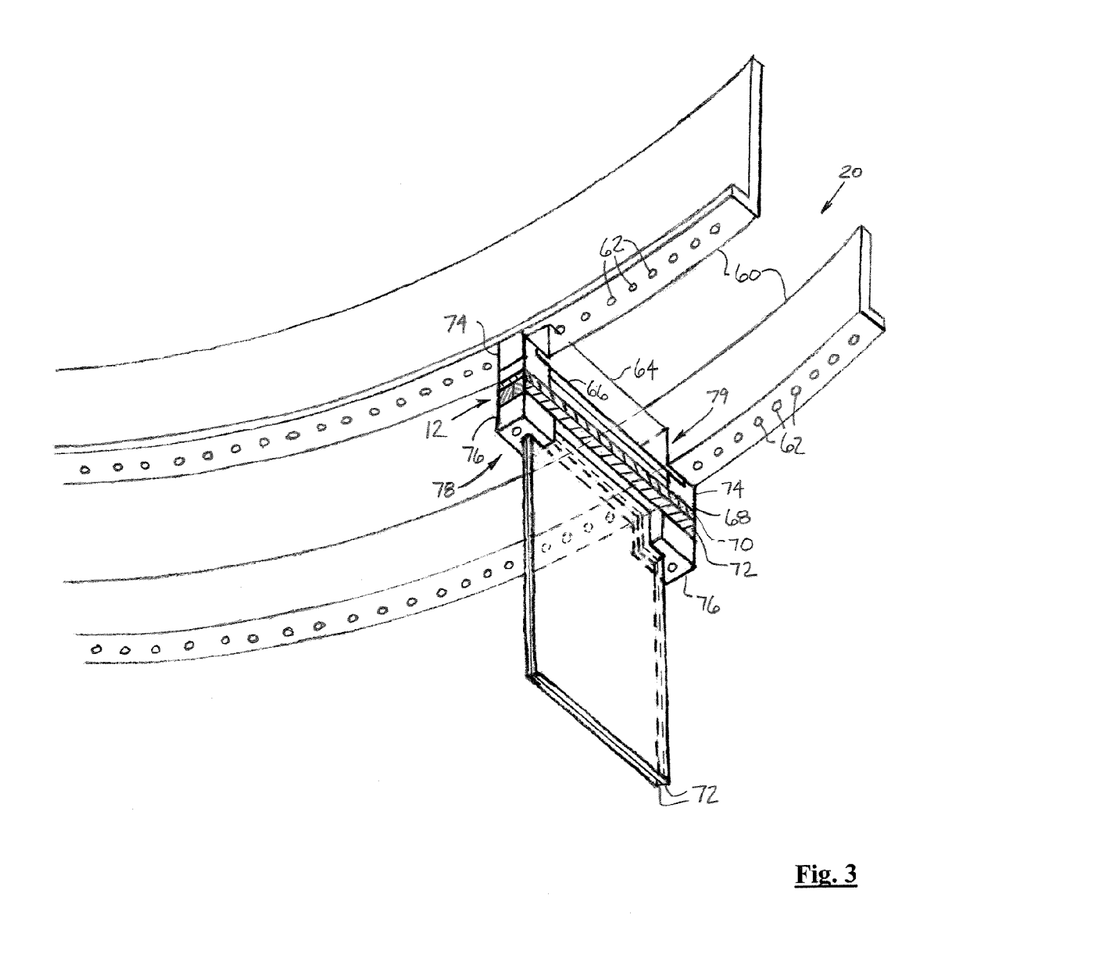
FIG. 3 is a perspective view of a detector array assembly in accordance with an embodiment of the present invention.

Referring now to FIG. 3, the detector assembly 20 in accordance with an embodiment of the present invention is shown. The detector assembly includes a pair of rails 60 and a series of flexible transmission circuits 12 (although only one is shown for simplicity of description). Each flexible transmission circuit 12 is coupled to the rails 60 via fasteners (not shown) that extend through holes 62. A collimator 64 removes x-ray scatter and focuses received x-rays into a scintillator 66, which converts the received x-rays into light energy. A detector 68, such as one of the detectors 34 in FIG. 2, receives the light energy and generates x-ray signals, which are transmitted through one or more electrically conductive substrate layers 70 and a flexible circuit cable 72. The flexible circuit cable 72 is bonded to the substrate layers 70. A pair of spacer blocks 74 are coupled between the rails 60 and the substrate layers 70 and are contoured to abut and be adjacent to the scintillator 66. A pair of flex clamp/retainers 76 hold and provide strain relief for the flexible circuit cables 72. The flexible transmission circuit 12 and components included therein are described in further detail below.

Figure 4:
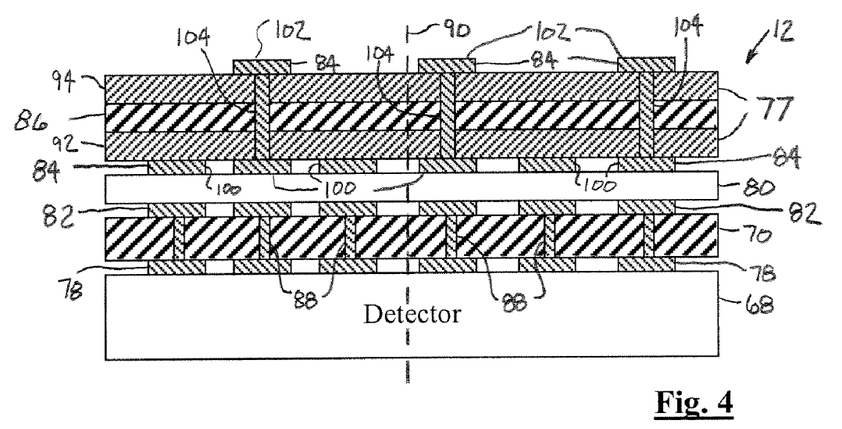
FIG. 4 is a cross-sectional view of the flexible detector array transmission circuit in accordance with an embodiment of the present invention.

In the embodiment of FIG. 3, the flexible circuit cables 72. Each circuit cable 72 may have multiple flexible circuit layers 77, which are best seen in FIG. 4. The circuit cables 72 are guided through and folded over the flex clamps 76 towards a left side 78 and a right side 79 of the flexible transmission circuit 12, to form a "T"-shaped configuration. The circuit cables 72 reside between the flex clamps 76 and the substrate layers 70. Of course, other configurations known in the art may be utilized.

Figure 5:
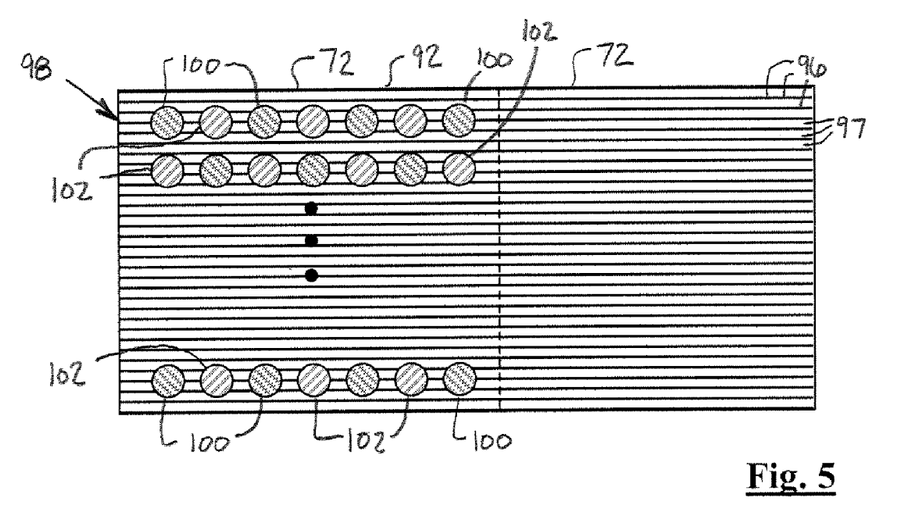
FIG. 5 is a top view of the flexible detector array transmission circuit in accordance with an embodiment of the present invention.

Referring now to FIGS. 4 and 5, a cross-sectional view and a top view of the flexible transmission circuit 12 in accordance with an embodiment of the present invention are shown. The flexible transmission circuit 12 includes the substrate layers 70 that are electrically coupled to the detectors 34, via detector bonding pads 78. The substrate layers 70 serve multiple purposes, which are stated below. One or more mono-directional conductive layers 80 (only one is shown) are electrically coupled to the substrate layers 70, via substrate bonding pads 82, and provide a unidirectional electrical coupling between the substrate layers 70 and flexible circuit layers 77. The flexible circuit layers 77 are electrically coupled to the mono-directional layer 80, via flexible circuit bonding pads 84 and direct the generated x-ray signals from the detector 68 to the data acquisition system 42. The flexible circuit layers 77 are coupled and isolated from one another via one or more insulation layers 86 (only one is shown), which are disposed between the flexible circuit layers 77.

Although, a specific number of substrate layers 70, mono-directional layers 80, flexible circuit layers 77, and insulation layers 86 are shown in FIGS. 3–5, any number of each layer may be utilized.

The substrate layers 70 provide a flat rigid support for alignment and bonding of electrical connections between the detector 68 and the flexible circuit layers 77. The substrate layers 70 in being rigid are capable of withstanding rotational forces exerted within the CT system 10 and provide an apparatus for aligning the detector 68 and scintillator 66 to the rails 60. The substrate layers 70 provide a first set of electrical vias 88 for direct routing of electrical connections between the detector bonding pads 78 and the substrate bonding pads 82. Electrical vias 88 refer to an etching or drilling within a layer to form holes therein and a subsequent filling of the holes with a conductive material, as known in the art. The substrate layers 70 may form various electrical routing patterns, which provide flexibility in not only routing design but also flexible transmission circuit design.

The substrate layers 70 may be formed of various materials including ceramics, organic epoxies, printed circuit board materials, or other similar substrate materials known in the art.

The mono-directional layers 80 provide direct electrical contact between the substrate bonding pads 82 and the flexible circuit bonding pads 84 along a single axis 90. The mono-directional layers 80 may include one or more anisotropic devices, as known in the art. The anisotropic devices may be in the form of an anisotropic conductive resin film, an anisotropic conductive resin membrane, or in a similar form known in the art.

The flexible circuit layers 77, as shown and according to an embodiment of the present invention, may include a first flexible circuit layer 92 and a second flexible circuit layer 94. The flexible circuit layers 92 and 94 include multiple conductive signal lines 96 or connections that are in parallel and transport the x-ray signals from the detector 68 to the DAS 42. In the embodiment as shown, the conductive lines 96 are divided between each of the flexible circuit layers 77, such that fewer conductive lines exist in each flexible circuit layer 77. For a determined amount of a detector array area 98, a given number of conductive lines may be coupled thereto, while maintaining enough pitch to provide a desired amount of electrical performance. The present invention by dividing the number of signal lines between the flexible circuit layers 77 allows for an increased number of signal lines per flexible circuit layer 77 and at the same time provides increased pitch, over that of prior art flexible transmission circuits, and therefore increased electrical performance.

As known in the art, it is relatively easy to provide a high density of bonding pads within a given area as opposed to providing a high density of fine signal lines. For this reason and due to the use of multiple flexible circuit layers, the present invention is able to provide an increased number of operational bonding pads within a determined area with associated signal lines for increased parallel transmission of x-ray signals between the detector assembly 20 and the DAS 42.

A first set of flexible circuit bonding pads 100 is coupled to a second set of flexible circuit bonding pads 102, through use of a second set of electrical vias 104. The electrical vias 104 are formed through the flexible circuit layers 77 and the insulating layers 86 in order to couple a divided respective portion of the lines 96 with a designated and respective portion of the first flexible circuit bonding pads 100. The lines 96 are coupled to the second flexible circuit layer 94.

The first set of flexible circuit bonding pads 100 are electrically coupled to the substrate circuit bonding pads 82 through the mono-directional layers 80. In applications when the substrate layers 70 are not used the flexible circuit bonding pads 100 are coupled through the mono-directional layers 80 and directly to the detector bonding pads 78.

The flexible circuit layers 77 are coupled within the flexible circuit cables 72 (only one is shown in FIG. 5). The flexible circuit cables 72 and the flexible circuit layers 77 may be integrally formed as a single unit, as shown, or may be separate devices that are coupled therebetween. The flexible circuit layers 77 may be formed from various materials including copper, silver, and nickel, as well as other conductive materials known in the art.

The insulation layers 86 provide separation and isolation between the flexible circuit layers 72. The insulation layers 86 may be in the form of a polyimide layer and include materials, such as thermoplastic resin, ceramic, and other insulating materials known in the art. The thermoplastic resin may include polyether imide (PEI), polyether ether ketone (PEEK), polyethylene naphthalate (PEN), polyethylene terephthalate (PET), or other similar resin material known in the art.

The lines 96 are separated by an insulation material 97, which may be an integral part of insulating layers 86 or may be formed of similar materials as that of the insulating layers 86. The insulation material may also include adhesive materials to aid in maintaining arrangement of the lines 96, shape of the flexible circuit layers 77 and the flexible circuit cables 72, and to provide durability of use thereof.

The detector bonding pads 78, the substrate bonding pads 82, and the flexible circuit bonding pads 84 may be in the form of electrically conductive pads, and as such, may be formed of various conductive materials known in the art. In FIG. 5, the flexible circuit bonding pads are shown in an alternating arrangement such that every other bonding pad is one of the first flexible circuit bonding pads 100 and corresponds with the first flexible circuit layer 92 and each of the remaining bonding pads is one of the second flexible circuit bonding pads 102, which correspond with the second flexible circuit layer 94. Any number of rows and columns of flexible circuit bonding pads 84 may exist.

The flexible transmission circuit 12 may be formed using heat and pressure techniques known in the art. The flexible transmission circuit 12 may also be formed by adhesive coupling of the flexible circuit layers 77.

Figure 6:
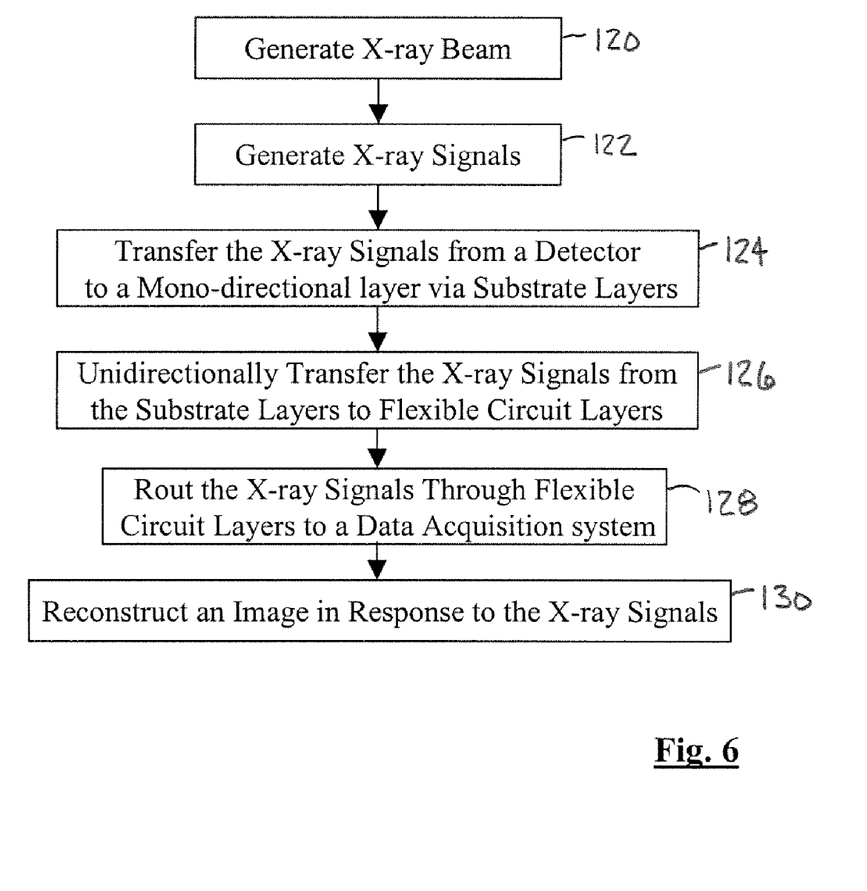
FIG. 6 is a logic flow diagram illustrating a method of reconstructing an image for the multi-slice computed tomography imaging system in accordance with an embodiment of the present invention.

Referring now to FIG. 6, a logic flow diagram illustrating a method of reconstructing an image for the multi-slice CT imaging system 10 in accordance with an embodiment of the present invention is shown.

In step 120, the source 18 generates the x-ray beam 32. In step 122, the detector assembly 20 performs a helical scan of the patient 23 and receives the x-ray beam 32 and generates projection data in the form of x-ray signals.

In step 124, the substrate layers 70 rout and transfer the x-ray signals to the mono-directional layers 80 through the first set of vias 88. In step 126, the mono-directional layers 80 unidirectionally transfer the x-ray signals from the substrate layers 70 to the flexible circuit layers 77. In step 128, the flexible circuit layers rout the x-ray signals from the mono-directional layers 80 to the DAS 42. In step 130, an image is reconstructed in response to the x-ray signals.

The above-described steps are meant to be an illustrative example; the steps may be performed synchronously, sequentially, simultaneously, or in a different order depending upon the application.

The present invention provides a flexible detector array transmission circuit with multiple flexible circuit layers and substrate layers. The present invention, due to use of the multiple flexible circuit layers provides increased pitch between signal lines within flexible circuit layers, increased yield, and increased electrical performance. The present invention due to use of the substrate layers also provides increased routing pattern flexibility.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A flexible detector array transmission circuit for an x-ray imaging system comprising:
    at least one mono-directional conductive layer electrically coupled to at least one detector; and
    a plurality of stacked flexible circuit layers electrically coupled to said at least one mono-directional conductive layer, each of said plurality of flexible circuit layers comprising fine line connections and directing x-ray signals generated by said at least one detector to a data acquisition system.

2. A circuit as in claim 1 further comprising at least one insulation layer disposed between said plurality of flexible circuit layers.

3. A circuit as in claim 1 further comprising a plurality of detector bonding pads electrically coupled to said at least one mono-directional conductive layer and to said at least one detector.

4. A circuit as in claim 1 further comprising a plurality of flexible circuit bonding pads electrically coupled to said at least one mono-directional conductive layer and to said plurality of flexible circuit layers.

5. A circuit as in claim 1 further comprising:
    a plurality of flexible circuit bonding pads electrically coupled to said at least one mono-directional conductive layer and to said first flexible circuit layer; and
    a plurality of electrical via coupling said plurality of flexible circuit bonding pads and said at least one mono-directional conductive layer;
    wherein said plurality of flexible circuit layers comprise a first flexible circuit layer and a second flexible circuit layer.

6. A circuit as in claim 1 wherein said plurality of flexible circuit layers comprise a plurality of parallel fine line connections.

7. A circuit as in claim 1 wherein said at least one detector is a backlit diode.

8. A circuit as in claim 1 wherein said plurality of parallel fine line connections are separated by an insulation material.

9. A circuit as in claim 1 further comprising at least one electrically conductive substrate layer electrically coupled to said at least one detector and to said at least one mono-directional conductive layer.

10. A flexible detector array transmission circuit for an x-ray system comprising:
    at least one electrically conductive substrate layer electrically coupled to at least one detector;
    at least one mono-directional conductive layer electrically coupled to said at least one electrically conductive substrate layer via a plurality of pads; and
    at least one flexible circuit layer electrically coupled to said at least one mono-directional conductive layer, said at least one flexible circuit layer directing generated x-ray signals from said at least one detector to a data acquisition system of the x-ray system.

11. A circuit as in claim 10 wherein said at least one electrically conductive substrate layer is a rigid support for alignment and bonding of electrical connections between said at least one detector and said at least one flexible circuit layer.

12. A circuit as in claim 10 wherein said at least one electrically conductive substrate layer comprises at least one electrical routing pattern between said at least one detector and said at least one flexible circuit layer.

13. A x-ray imaging system comprising:
 a source generating an x-ray beam;
 at least one detector receiving said x-ray beam and generating projection data;
 a flexible detector array transmission circuit comprising;
  at least one mono-directional conductive layer electrically coupled to said at least one detector; and
  a plurality of flexible circuit layers electrically coupled to said at least one mono-directional conductive layer;
 at least one isolation layer disposed between said plurality of flexible circuit layers; and
 an image reconstructor electrically coupled to said flexible detector array transmission circuit, receiving said projection data from said at least one detector, and reconstructing an image in response to said projection data.

14. A system as in claim 13 further comprising a plurality of detector bonding pads electrically coupled to said at least one mono-directional conductive layer and to said at least one detector.

15. A system as in claim 13 further comprising a plurality of flexible circuit bonding pads electrically coupled to said at least one mono-directional conductive layer and to said plurality of flexible circuit layers.

16. A system as in claim 13 further comprising:
 a plurality of flexible circuit bonding pads electrically coupled to said at least one mono-directional conductive layer and to said first flexible circuit layer; and
 a plurality of electrical via coupling said plurality of flexible circuit bonding pads and said at least one mono-directional conductive layer;
 wherein said plurality of flexible circuit layers comprise a first flexible circuit layer and a second flexible circuit layer.

17. A system as in claim 13 further comprising at least one electrically conductive substrate layer electrically coupled to said at least one detector and to said at least one mono-directional conductive layer.

18. A system as in claim 17 wherein said at least one electrically conductive substrate layer comprises at least one electrical routing pattern between said at least one detector and said plurality of flexible circuit layers.

* * * * *